United States Patent [19]
Tamaoki et al.

[11] Patent Number: 5,609,344
[45] Date of Patent: Mar. 11, 1997

[54] SPIRAL GASKET HAVING A CENTERING SPRING

[75] Inventors: Kenji Tamaoki; Hideaki Shimamoto; Masaki Kawada, all of Hiroshima; Shigeru Morita; Michio Fujino, both of Kanagawa; Youzi Hamazaki, Osaka, all of Japan

[73] Assignees: Yumex Corporation, Hiroshima; Nichias Corporation, Tokyo; Kokubu Indusrial Co., Ltd., Osaka, all of Japan

[21] Appl. No.: 500,678

[22] Filed: Jul. 11, 1995

Related U.S. Application Data

[63] Continuation-in-part of Ser. No. 359,450, Dec. 20, 1994, abandoned.

[30] Foreign Application Priority Data

Dec. 28, 1993 [JP] Japan ................. 5-074544 U

[51] Int. Cl.$^6$ .................................................. F16J 15/12
[52] U.S. Cl. .................... 277/157; 277/162; 277/204; 277/233; 277/235 R
[58] Field of Search .................... 277/138, 157, 277/159, 162, 163, 164, 198, 203, 204, 233, 235 R

[56] References Cited

U.S. PATENT DOCUMENTS

| | | | |
|---|---|---|---|
| 1,694,311 | 12/1928 | Clark | 277/162 |
| 1,831,574 | 11/1931 | Norton | 277/162 |
| 2,311,557 | 2/1943 | Mason | 277/159 |
| 2,339,479 | 1/1944 | McCreary | 277/204 |
| 2,520,089 | 8/1950 | Lippincott | 277/204 |
| 5,161,807 | 11/1992 | Allen et al. | 277/204 |
| 5,308,090 | 5/1994 | Hamada et al. | 277/204 |

FOREIGN PATENT DOCUMENTS

| | | | |
|---|---|---|---|
| 246073 | 7/1963 | Australia | 277/204 |
| 936837 | 11/1955 | Germany | 277/204 |
| 188166 | 2/1956 | Germany | 277/204 |

*Primary Examiner*—William A. Cuchlinski, Jr.
*Assistant Examiner*—John L. Beres
*Attorney, Agent, or Firm*—Flynn, Thiel, boutell & Tanis, P.C.

[57] ABSTRACT

A spiral gasket apparatus, capable of being held on an inclined flue gas outflow pipe without falling off therefrom, is constructed by winding a metal hoop member and a filler member, superposed on each other. A part of the hoop member from the beginning extremity of the hoop member on the inner side, which is wound as many as several turns to a welded fixed portion thereof, is raised inward by using the welded fixed portion as a fulcrum. An extremity portion thereof is folded back to form a superposition part. Since the raised part of the hoop member acts as a spring and is brought elastically into contact with an inclined flue gas outflow pipe, the gasket is held on the flue gas outflow pipe.

2 Claims, 6 Drawing Sheets

SPIRAL GASKET HAVING A CENTERING SPRING

This application is a continuation-in-part of U.S. Ser. No. 08/359 450, filed Dec. 20, 1994, now abandoned.

FIELD OF THE INVENTION

The present invention relates to a spiral gasket, and, in particular, to an improvement of a spiral gasket inserted e.g. between flanges formed at the extremities of pipes in a pipe connecting portion of a flue gas outflow duct for a vehicle to be used for sealing the duct.

BACKGROUND OF THE INVENTION

FIGS. 6 and 7 show a prior art spiral gasket. In the figures, reference numeral 1 represents a hoop member consisting of a metal thin plate (about 0.13 mm–0.15 mm thick) having an undulated cross-section and 2 indicates a filler member made mainly of inorganic fiber, etc.

In order to fabricate a spiral gasket constructed as described above, at first only the hoop member 1 is wound around a take-up piece (not indicated in the figures) as much as two or three turns (idle winding) and then a welded fixed portion 3 is formed by spot welding at a predetermined position in this idle winding part. Thereafter a filler member 2 is inserted between different turns and the hoop member and the filler member are wound, superposed on each other. At the end of the winding, again only the hoop member is wound and different turns of the hoop member are secured to each other by spot welding.

The welded fixed portion 3 of the hoop member on the inner side is formed at a position distant from the beginning of the winding by about a quarter turn for a reason of the fabrication. Since a part 1a of the hoop member corresponding to the quarter turn remains unattached and a burr at the extremity thereof is dangerous at handling it, the part 1a of the hoop member is cut at the proximity of the welded fixed portion 3 to be removed for obtaining a final product. In FIG. 6, 1 corresponds to about a quarter turn.

FIGS. 8 and 9 show a state where the final product of the spiral gasket, thus obtained, is put between flanges formed at extremities of pipes in a pipe connecting portion of a flue gas outflow duct on a vehicle to be used, in which A indicates the spiral gasket thus constructed; 4 and 5 are flue gas outflow pipes; 6 and 7 are flanges; 8 and 9 are a bolt and a nut, respectively, for fastening them together.

When the spiral gasket is mounted on a flue gas outflow pipe, in the case where the flue gas outflow pipe is in a horizontal state with respect to the floor surface, as indicated in FIG. 8, the gasket mounted thereon is supported stably at a predetermined position. However, in the case where the flue gas outflow pipe is in an inclined state with respect to the floor surface, the gasket mounted thereon is apt to fall off. In this connection, when a spiral gasket having an inner diameter of 50.0 mm and an outer diameter of 65.0 mm is used for a flue gas outflow pipe having an outer diameter of 48.6±0.3 mm, there is a gap of 1.1 to 1.7 mm therebetween and thus the gasket falls off easily from the flue gas outflow pipe. For this reason, the bolt and the nut should be fastened in a state where the gasket is pressed down so as not to fall off from the flue gas outflow pipe and therefore efficiency of work for mounting the gasket is extremely low.

OBJECT OF THE INVENTION

In order to solve the above problem the main object of the present invention is to provide a spiral gasket which can be held without falling off even on an inclined flue gas outflow pipe.

SUMMARY OF THE INVENTION

A spiral gasket constructed by winding a metal hoop member and a filler member in a spiral form, superposed on each other, according to the present invention, is characterized in that a part of the hoop member is raised partially in a circumferential direction with respect to the hoop member on the inner periphery side, which is wound as many as several turns, the part of the hoop member being formed so as to act as a spring with respect to an outer peripheral surface of a pipe, the hoop member in the proximity of the part of the hoop member acting as a spring being fixed by welding.

According to the spiral gasket constructed as described above, since the part of the hoop member raised on the inner periphery side of the gasket has a spring action, the gasket put on a flue gas outflow pipe is held elastically with respect to the flue gas outflow pipe by this part of the hoop member having the spring action. Consequently the gasket mounted on an inclined flue gas outflow pipe is held on the flue gas outflow pipe without falling off therefrom.

DETAILED DESCRIPTION

Figure 1:
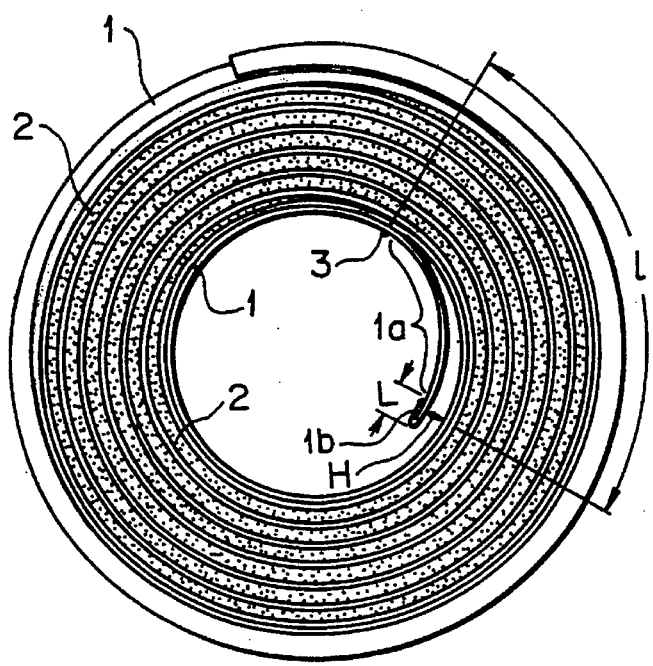
FIG. 1 is a front view of a spiral gasket, which is an embodiment of the present invention.
Figure 2:
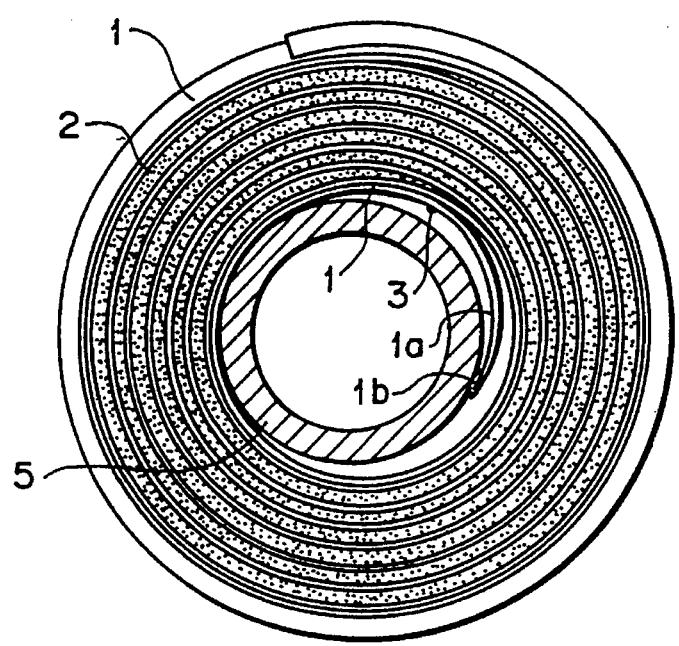
FIG. 2 is a front view showing a state where the spiral gasket is put on a flue gas outflow pipe.
Figure 6:
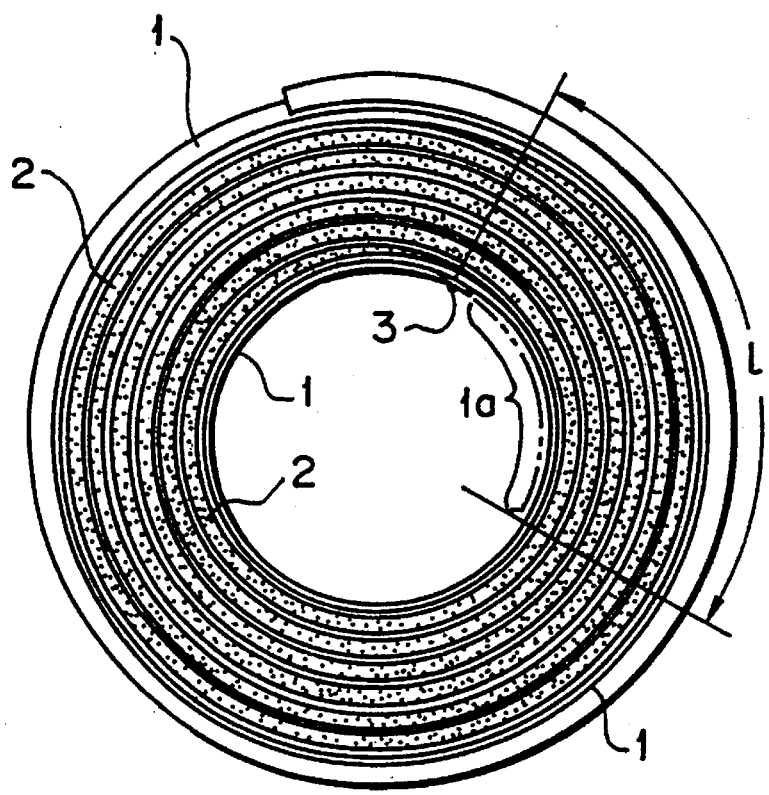
FIG. 6 is a front view of a prior art spiral gasket.
Figure 7:
FIG. 7 is a cross-sectional view of the prior art spiral gasket.
Figure 8:
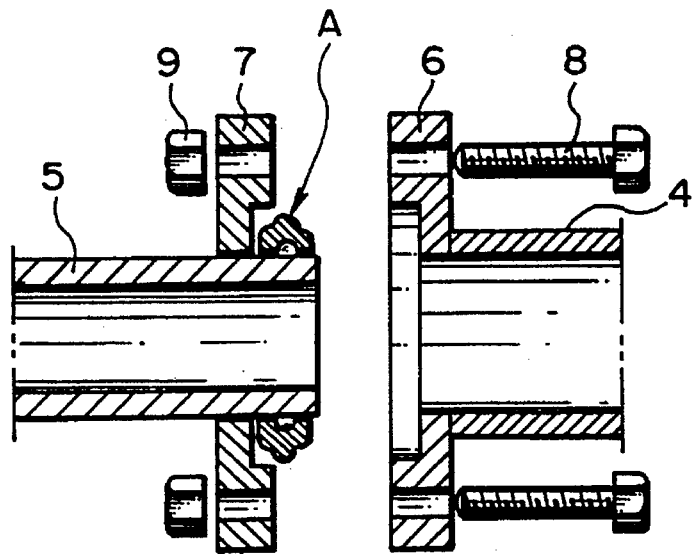
FIG. 8 is a diagram for explaining a state, where the prior art spiral gasket is mounted on a horizontal flue gas outflow pipe.

FIGS. 1 and 2 show an embodiment of the present invention, in which items identical or similar to those indicated in FIGS. 6 and 7 are referred to by same reference numerals.

That is, reference numeral 1 is a hoop member consisting of a metal thin plate having an undulated cross-section and 2 is a filler member. A part 1a of the hoop member between the beginning extremity of the hoop member wound as much as several turns on the inner side of the gasket and a welded fixed portion 3 distant therefrom by about a quarter turn is raised inward from the gasket, using the welded fixed portion 3 as a fulcrum and the extremity portion thereof is folded back in a flat state to form a superposed part 1b. When the part 1a of the hoop member is raised, the raised distance H at the extremity of the innermost turn is preferably in a region of 2 to 7 mm. The superposition length L of the superposed part 1b is preferably about 5 mm. Although the extremity superposed part 1b in the part 1a of the hoop member is folded back inward, it may be folded back outward. In FIG. 1, 1 corresponds to about a quarter turn.

According to a spiral gasket thus constructed, when the spiral gasket is mounted on the flue gas outflow pipe 5, as indicated in FIG. 2, the part 1a of the hoop member raised inward from the gasket acts as a spring member and the extremity superposed part 1b is brought elastically into contact with the flue gas outflow pipe 5 so that the gasket is held elastically on the flue gas outflow pipe owing to the spring action of the part 1a of the hoop member 1a.

Consequently, when the spiral gasket is mounted on an inclined flue gas outflow pipe and fastened thereon by means of bolts and nuts, since the gasket is held elastically on the flue gas outflow pipe by the part 1a of the hoop member having the spring action, there is no fear that the gasket falls off.

The field of utilization of the spiral gasket is not restricted to the flue gas outflow pipe for a vehicle, but it can be widely used for sealing any other fluid pipings.

Figure 3:
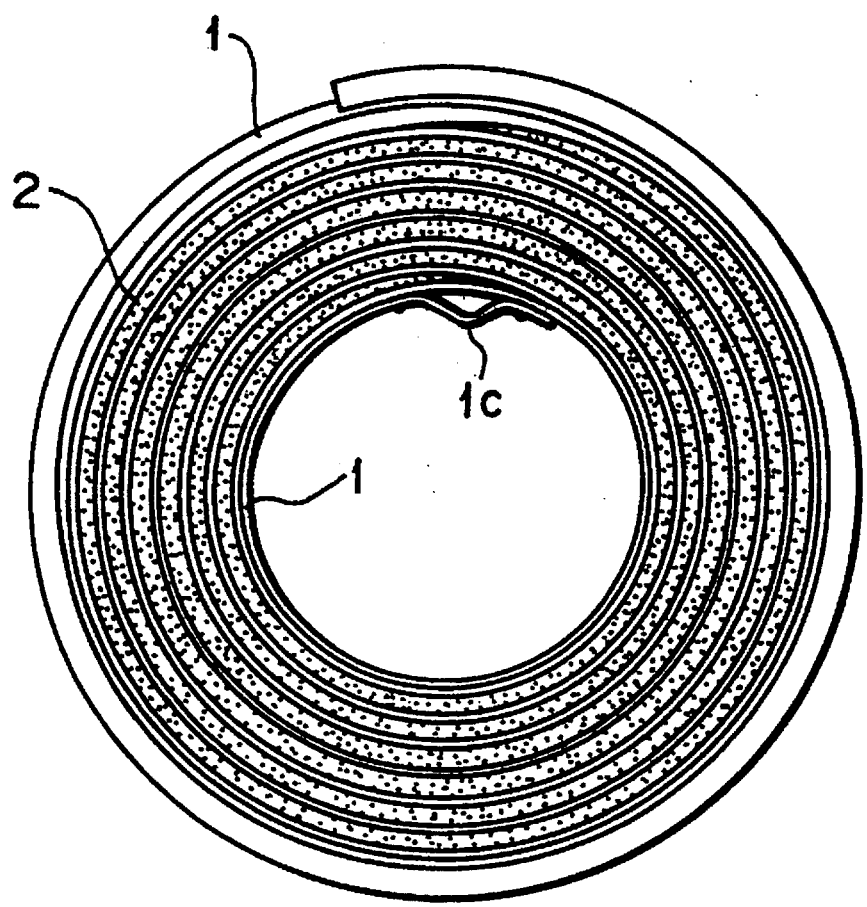
FIG. 3 is a front view of a spiral gasket, which is another embodiment of the present invention.

FIG. 3 shows another embodiment of the present invention.

In the present embodiment, a chevron-shaped hoop part 1c raised inward is formed in the proximity of the beginning extremity of the hoop member 1 wound as much as several turns on the inner side and welded fixed portions are disposed in the proximity of the chevron-shaped hoop part 1c.

In this construction the chevron-shaped hoop portion 1c acts as a spring against the outer peripheral surface of the pipe. Since force of this type of spring is more stable than that of the spring part 1a of the hoop member indicated in FIGS. 1 and 2, the former is more advantageous than the latter.

Figure 4:
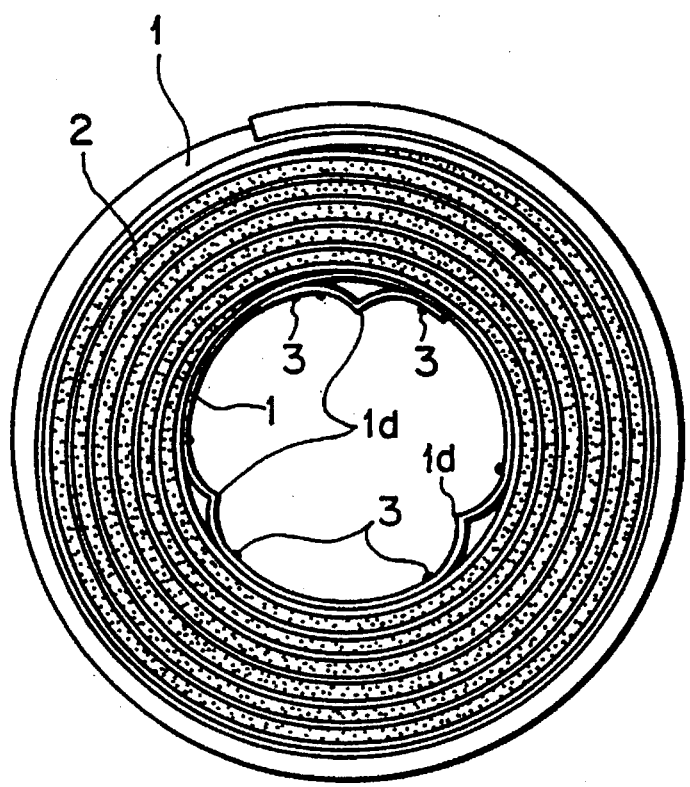
FIG. 4 is a front view of a spiral gasket, which is still another embodiment of the present invention.
Figure 5:
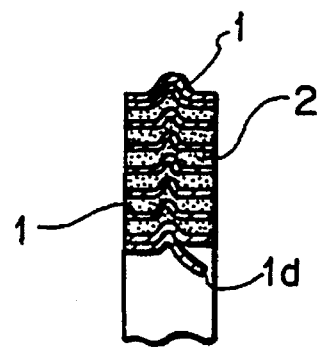
FIG. 5 is a partial cross-sectional view of the spiral gasket indicated in FIG. 4.

FIGS. 4 and 5 show still another embodiment of the present invention.

In this embodiment, three chevron-shaped hoop portions 1d are formed with an interval of about 120° around the center by raising a half of the width towards the center. Welded fixed portions 3 are disposed at the proximity of each of the chevron-shaped hoop parts 1d.

In this construction, since the three chevron-shaped hoop parts 1d act as springs against the outer peripheral surface of the pipe, holding force by the springs on the pipe is increased and at the same time an effect of centering the gasket with respect to the pipe is obtained.

Figure 10:
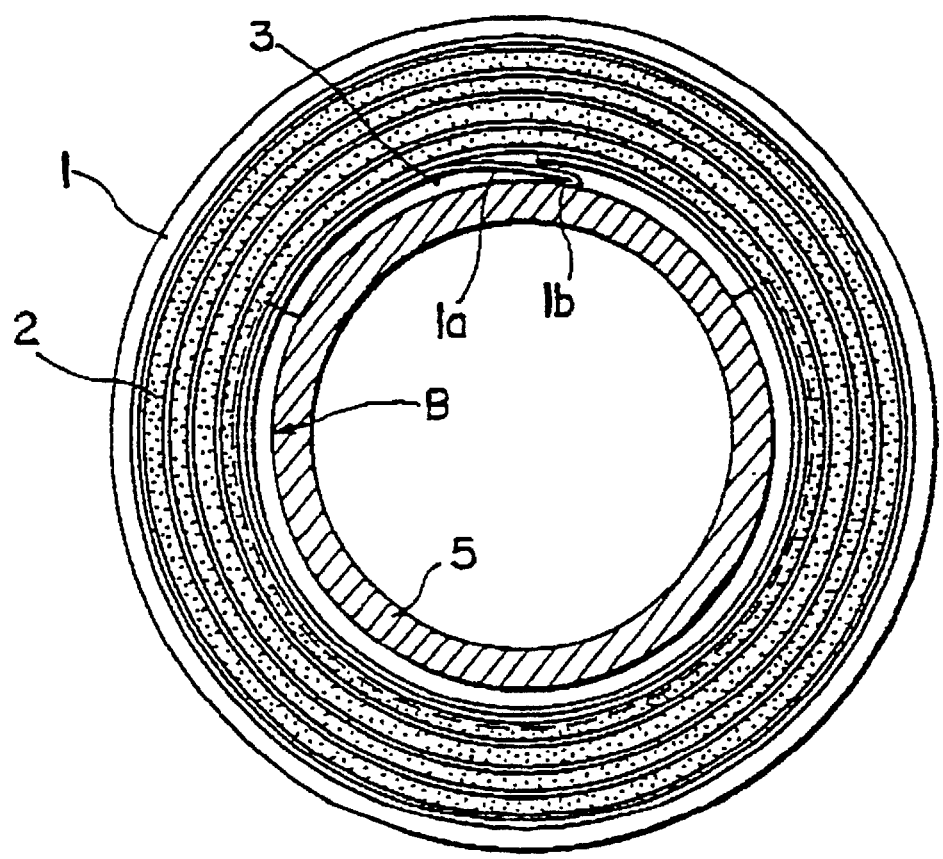
FIG. 10 shows a front view of a further embodiment of a spiral gasket embodying the present invention.

FIG. 10 shows still another embodiment of the present invention, in which a centering ring-shaped spring B is thrust against the inner peripheral surface of the hoop member 1 of the gasket body by its elastic force. The spring B is made of a metal bar having a round cross-section formed in a C-shape, which is opened at one place. It is preferable that it forms an angle of 200° to 300° around the center. It can be mounted by insertion in an elastically thrusting state on the inner peripheral side of the hoop member of the gasket body by releasing it after having inserted an opened spring, which is slightly greater than the inner diameter of the gasket body, in a contracted state. The C-shaped ring spring can be easily obtained by bending processing a metal bar having a round cross-section into a ring shape. In this case a material for the metal bar is selected so that it touches externally the inner peripheral surface of the gasket body and at the same time internally the outer peripheral surface of the pipe, which is to be sealed, when it is deformed into a C-shaped ring spring. The pipe is inserted into the spring B.

When the gasket body, on which the C-shaped ring spring B defined as described above is mounted is used, the pipe is automatically centered by this spring B. Therefore, the gasket body is never deviated with respect to the pipe 5, but kept at its normal position. In this way the inconvenience of exhaust gas leaking from the pipe directly onto the sealing surface of the gasket body is eliminated.

It is possible also to regulate the amount of compression of the gasket by adjusting the magnitude of the diameter of the round cross-section of the C-shaped ring spring B engaged with the inner peripheral surface of the gasket body.

A part 1a of the hoop member is engaged with the outer peripheral surface of the pipe through the opened place in the C-shape of the ring B to act as an elastically thrusting member.

Figure 9:
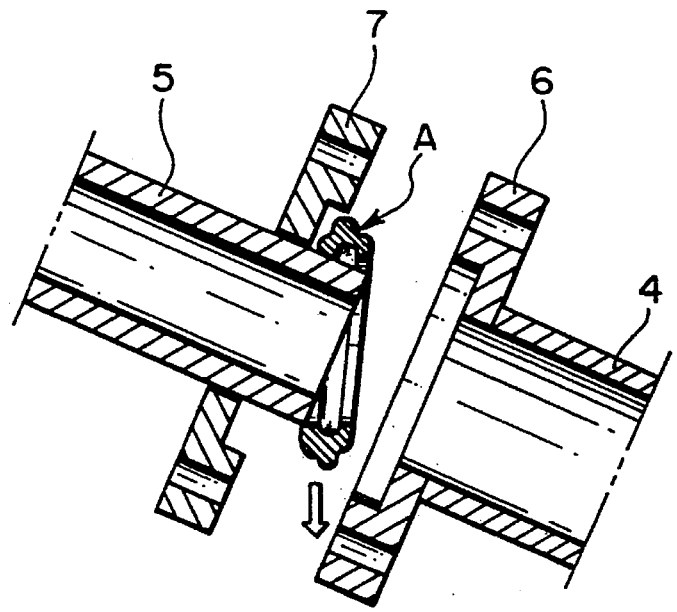
FIG. 9 is a diagram for explaining a state, where the prior art spiral gasket is mounted on an inclined flue gas outflow pipe.

According to the embodiment indicated in FIG. 10, the effect of centering the gasket body can be obtained easily and at the same time, when the gasket body is mounted on an inclined pipe as indicated in FIG. 9, the gasket body is thrust elastically against the pipe by the part 1a of the hoop member and thus fallout thereof from the pipe can be avoided.

As a centering ring, it is known heretofore, a circular ring perfectly closed, as described in U. S. Pat. No. 5,308,090. However, since the ring body is mounted so as to form a ring-shaped closed cross-section together with an inner peripheral hoop member by forming a V- or U-shaped cross-section by using a thin metal hoop member, (a) a special press forming step is necessary for fabricating the ring body; (b) fabrication cost is high; (c) it is easily deformed, because strength thereof is extremely low; and (d) work of mounting it on the gasket body is laborious and stability is bad.

As described above, according to the present invention, a spiral gasket can be obtained, which can be held also on an inclined piping without falling off therefrom.

Particularly, since the spiral gasket indicated in FIGS. 1 and 2, according to the present invention, is so constructed that the part of the hoop member on the inner side, which was cut away in a fabrication step of a prior art gasket, is raised so as to act as a spring member, although processing cost for raising it is somewhat higher than cost for cutting it away, the cost is extremely low with respect to cost for disposing a new spring member thereon.

Further by the spiral gasket indicated in FIG. 3 according to the present invention, stabilization of the spring force against the piping can be obtained. By the spiral gasket indicated in FIGS. 4 and 5 spring force and a centering effect can be obtained.

Further, when the C-shaped ring spring is used, it is suitable specifically for centering the gasket body and, in addition, the following effects can be obtained also with respect to the prior art centering ring.

(1) Since the C-shaped ring body used as a centering member for the gasket body is an open ring, when it is mounted on the inner peripheral side of the gasket body, it can be mounted easily only by slightly contracting it. That is, mounting operability is extremely high.

(2) Since the C-shaped ring can be fabricated only by bending a metal bar having a round cross-section in a ring shape, fabrication thereof is easy and the cost of the starting material is low with respect to that required for a perfectly closed ring body.

(3) Since the C-shaped ring has a round cross-section, it has a high strength with respect to a centering member having a V- or U-shaped cross-section, and it is useful for preventing buckling at tightening the gasket body.

(4) It is possible also to regulate the amount of compression of the gasket body by adjusting the diameter of the round cross-section of the C-shaped ring.

What is claimed is:

1. In a spiral gasket constructed by winding a metal hoop member and a filler member in a spiral form, superposed on each other, a part of the hoop member being raised partially in a circumferential direction with respect to the hoop member on the inner peripheral side, which is wound as much as several turns, the part of the hoop member being formed so as to act as a spring with respect to an outer peripheral surface of a pipe, the hoop member in the proximity of the part of the hoop member acting as a spring being fixed, the improvement wherein a centering ring-shaped spring made of a metal bar having a round cross-section formed in a C-shape, which is opened at one place, is thrust by its elastic force against an inner peripheral surface of said hoop member, said pipe being inserted into said C-shaped ring spring so that the spring engages with the peripheral surface of the pipe, and the part of the hoop member is engaged with the outer peripheral surface of the pipe through the opened place of the C-shaped ring spring.

2. A spiral gasket according to claim 1, wherein the part of the hoop member from the beginning extremity of the hoop member on the inner side wound as much as several turns to the proximity of a fixed portion is raised inward by using the fixed portion as a fulcrum, the part of the hoop member acting as a spring against the outer peripheral surface of the pipe.

* * * * *

UNITED STATES PATENT AND TRADEMARK OFFICE
CERTIFICATE OF CORRECTION

PATENT NO. : 5 609 344
DATED : March 11, 1997
INVENTOR(S) : Kenji TAMAOKI, et al.

It is certified that error appears in the above-indentified patent and that said Letters Patent is hereby corrected as shown below:

On the title page, item [73], change the name of assignee;

"Kokubu Indusrial Co., Ltd."

to ---Kokubu Industrial Co., Ltd.---.

Signed and Sealed this

Twenty-sixth Day of August, 1997

Attest:

BRUCE LEHMAN

Attesting Officer

Commissioner of Patents and Trademarks